United States Patent
Bruylants et al.

(10) Patent No.: US 6,624,227 B1
(45) Date of Patent: Sep. 23, 2003

(54) PHOSPHONIC ACID REACTION PRODUCTS AND USE IN COATING COMPOSITIONS

(75) Inventors: Paul Peter Bruylants, Boortmeerbeek (BE); Josef Huybrechts, Oud-Turnhout (BE); Kenneth S. Kirshenbaum, West Bloomfield, MI (US); Charles T. Berge, Rochester Hills, MI (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/462,966

(22) PCT Filed: Jul. 29, 1998

(86) PCT No.: PCT/US98/15761

§ 371 (c)(1),
(2), (4) Date: Jul. 12, 2000

(87) PCT Pub. No.: WO99/06450

PCT Pub. Date: Feb. 11, 1999

Related U.S. Application Data

(60) Provisional application No. 60/054,179, filed on Jul. 30, 1997.

(51) Int. Cl.$^7$ ............... C08K 3/08; C08L 43/00; C08L 51/00; C08L 85/02; C23F 11/167; C08F 8/40; C08G 79/04

(52) U.S. Cl. ............... 524/439; 524/504; 524/547; 525/188; 525/340; 525/538; 106/14.12; 252/389.2

(58) Field of Search ............... 524/547, 504, 524/556, 839, 439, 441; 525/188, 340, 330.4, 538; 252/389.2, 389.22, 389.24; 106/14.12

(56) References Cited

U.S. PATENT DOCUMENTS 4,675,358 A * 6/1987 Frangou ............... 524/439
5,151,125 A   9/1992 Kuwajima et al.
5,429,674 A * 7/1995 Lamers et al. ............... 106/404
5,607,990 A * 3/1997 Dorn et al. ............... 524/115
5,637,441 A   6/1997 Brenk et al.
5,712,345 A * 1/1998 Erikkla et al. ............... 525/131
5,912,294 A * 6/1999 Schade ............... 524/501
5,936,026 A * 8/1999 Huybrechts et al. ............... 524/504

FOREIGN PATENT DOCUMENTS

| EP | 0 319 971 A3 | 6/1989 |
| EP | 0 391 230 A2 | 10/1990 |
| EP | 0 401 833 A2 | 12/1990 |
| GB | 2116185 * | 9/1983 |
| WO | WO 96/08518 A1 | 3/1996 |

OTHER PUBLICATIONS

Copy of International Search Report, International Application No. PCT/US98/15761.

* cited by examiner

Primary Examiner—Callie Shosho
(74) Attorney, Agent, or Firm—Sudhir G. Deshmukh

(57) ABSTRACT

The invention provides an aqueous coating composition comprising nonionically and/or anionically stabilized film-forming polymers and metallic pigments and a compound which is the reaction product of a phosphonic acid derivative, a hydroxy-functional addition polymers and, optionally a compound having a hydroxy group, in which the phosphonic acid derivative is selected from one or both of

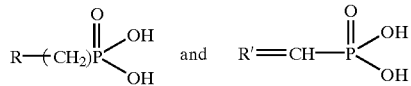

wherein R and R' are selected from the group consisting of an aliphatic and an aromatic substituent having 1 to 25 carbon atoms optionally including heteroatoms of at least one of oxygen, phosphorus and silicon.

10 Claims, No Drawings

PHOSPHONIC ACID REACTION PRODUCTS AND USE IN COATING COMPOSITIONS

This application claims the benefit of provisional application ser. No. 60/054,179 filed Jul. 30, 1997.

BACKGROUND OF THE INVENTION

U.S. Pat. No. 4,675,358 discloses coating compositions employing phosphoric acid derivatives. Such compositions are not very hydrolytically stable. WO 96/08518 describes N-acyl aminomethylene phosphonates and derivatives and their use in waterborne coatings. Such compositions have limited compatibility with other binders and limited durability because of N-containing linkages. EP 391,230 discloses compounds which are the reaction product of an alpha-aminomethylene phosphonic acid with an epoxy group of a compound containing at least one epoxy group. Such reaction products have limited end use in water-borne compositions that are anionically stabilized since the amino group destabilizes the coating composition. U.S. Pat. No. 5,151,125 discloses aqueous metallic coating compositions comprising acrylic copolymers to reduce the gassing of aluminum flakes. Such compositions have limited hydrolytic stability and limited effectiveness.

SUMMARY OF THE INVENTION

We have found that hydrophobic-substituted phosphonic acid derivatives which are reaction products with hydroxy-functional copolymers are particularly effective for inhibiting the corrosion of metallic pigments in water-borne compositions. The invention concerns an aqueous coating composition comprising a stabilized film-forming polymer, a metallic pigment and a compound which is the reaction production of a, b and optionally c, wherein:

(a) is 5 to 95 weight percent of a phosphonic acid derivative consisting of one or both of

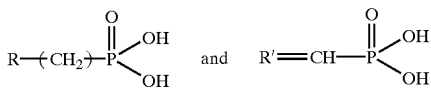

wherein R and R' are selected from the group consisting of an aliphatic, cycloaliphatic and aromatic substituent having 1 to 25 carbon atoms and optionally up to 10 heteroatoms of at least one of oxygen, phosphorus and silicon;

(b) is 5 to 95 weight percent of a hydroxy-functional addition polymer with a weight average molecular weight of 1000 to 30,000; and (c) is 0 to 90 weight percent of a compound having one hydroxy-functional group.

Representative examples of phosphonic acid group-containing compounds are vinyl phosphonic acid, propyl and octyl phosphonic acid, and hydroxyethane diphosphonic acid.

Representative examples of hydroxy-functional polymers are addition copolymers of methacrylates, vinylaromatics, acrylates, acrylamides/methacrylamides and their derivatives, acrylonitrile, methacrylonitrile, allylalcohol, maleates, itaconates and vinyl monomers. The copolymers are hydroxy and/or acid functional. Typical comonomers useful to obtain the hydroxy-functionality are 2-hydroxy ethyl acrylate, 2-hydroxyethyl methacrylate, 2-hydroxy propyl acrylate, 2-hydroxy propyl methacrylate, allyl alcohol, 1,4-butenediol, 4-hydroxybutyl acrylate, bis-hydroxy ethyl maleate and the like. Preferred hydroxy-functional copolymers are copolymers of styrene and allyl alcohol. A preferred phosphonic acid derivative is propyl and octyl phosphonic acid.

The hydroxy functional copolymers are typically prepared in a free-radical initiated process using peroxy or azo initiators. The reaction between the hydroxy functional copolymer and the vinyl and/or alkyl phosphonic acid can be run in a fusion or solvent process where water is distilled.

The reaction products of the phosphonic acid derivatives and the hydroxy-functional copolymers are used to treat metallic pigments before the final blend is inverted in water. The final metallic pigment dispersions are stable from gassing.

DETAILED DESCRIPTION

Preferred coating compositions are the following:

where the reaction product as corrosion inhibitor is used in the form of a salt;

where the phosphonic acid derivative is propyl, octyl or vinylphosphonic acid;

where the hydroxy-functional product is based on a styrene-allyl copolymer;

where the corrosion inhibitor based on phosphonic acid has an acid value of 25 to 400 mgKOH/g;

where the composition is anionically or non-ionically stabilized, and where the film-forming polymers are anionically stabilized vinyl, acrylic and/or urethane emulsions.

Preferred phosphonic acid group-containing reaction products are those formed from one or more of vinyl phosphonic acid, propyl and octyl phosphonic acid, and hydroxyethane diphosphonic acid with one or more hydroxy-functional copolymers of styrene and allyl alcohol. Preferably, R and R' have up to 12 carbon atoms and effect good hydrophilic-lipophilic balance (HLB).

EXAMPLES

Example 1

In a reaction vessel fitted with stirrer, thermometer, reflux condenser and Dean and Stark separator, a mixture of 300 parts xylene, 300 parts styrene/allyl alcohol copolymer commercially available from ARCO Chemicals under the trade name ARCO SAA 100 resin having a number average molecular weight of 1600 and a hydroxy number of 210 was heated at 85–90° C. till dissolved. There was then added 129.33 parts of octyl phosphonic acid (80% solution in water/ethanol=1/1). The temperature was raised to reflux (±148° C.) while water was removed. After 2 hours, 16 parts of water had been removed and the contents of the reactor were vacuum stripped. The reaction product was diluted with 270 parts of 2-butoxyethanol.

Test Results:

| | |
|---|---|
| Solids | 58.8% |
| Viscosity (Gardner Holdt) | W |
| Acid value | 148 mgKOH/g |
| Number Average MW | 1700 |
| Weight Average MW | 4400 |

Example 2

Procedure of Example 1 was repeated using 300 parts xylene, 300 parts aforedescribed ARCO SAA 100 resin, i.e., styrene/allylalcohol copolymer, 215.55 parts octyl phosphonic acid. In total, 28 parts of water were stripped in about 2 hours. After vacuum stripping, the reaction product was diluted in 310 parts of 2-butoxyethanol.

Test Results:

| Solids | 59.7% |
|---|---|
| Viscosity (Gardner Holdt) | V - 1/4 |
| Acid value | 188 mgKOH/g |
| Number Average MW | 1300 |
| Weight Average MW | 3800 |

Example 3

Procedure of Example 1 was repeated in which 240 parts styrene/allyl alcohol copolymer were reacted with 73.8 parts of p-tert amylphenol and 137.33 parts of Cublen® K60 in 350 parts of xylene. Cublen® K60 is a 60% solution in water of hydroxy ethane diphosphonic acid from Zschimmer and Schwarz Company.

Test Results:

| Solids | 58.4% |
|---|---|
| Viscosity | Y |
| Acid value | 184 mgKOH/g |
| Number Average MW | 1560 |
| Weight Average MW | 4260 |

Example 4

Procedure of Example 1 was repeated in which 100 parts xylene, 300 parts of styrene/allyl alcohol copolymer and 85 parts of vinylphosphonic acid were used.

Test Results:

| Solids | 59.8% |
|---|---|
| Viscosity | Z2 |
| Acid value | 178 mgKOH/g |
| Number Average MW | 1100 |
| Weight Average MW | 2400 |

Example 5

Styrene/Allyic Alcohol Copolymer Modified with Propyl Phosphonic Acid

Into a 500 ml 3-neck round bottom flask fitted with a reflux condenser, water separate and air driven stirrer place the following and heat to 80–90° C. until dissolved:

| Xylene | 50.0 grams |
|---|---|
| ARCO SAA100 resin | 100.0 grams |
| (commerically avaliable from ARCO Chemicals) | |
| Add the following and raise temperature to reflux (~148° C.): | |
| propyl phosphonic acid | 36.2 grams |

Continue to heat for 2 to 3 hours when approximate 5.6 grams of water will have been removed by azeotropic distillation. Cool to 100° C. and begin vacuum strip to remove about 50 grams of solvent. At the end of the distillation, add the following to the reactor and allow to cool.

| Butylcelosolve | 90.0 grams |
|---|---|
| Fill out into a plastic container. | |
| Product | |
| Acid Number | 145 |
| Weight Solids | 59% |

Example 6

| Paint Example: | Parts: |
|---|---|
| Dispersions | |
| Inhibitor Example 2 | 7.83 |
| Butyl Glycol | 58.42 |
| Alu Flake (1) | 30.75 |
| Dimethylethanolamine | 1.50 |
| Thickener (2) | 1.50 |
| Aluminum Based Paint | |
| Dispersion of Inhibitor of Example 2 | 24.03 |
| Latex (3) | 27.53 |
| D.I. water | 47.55 |
| Defoamer (4) | 0.01 |
| Thickener Combination (5) | 0.88 |
| Gassing Results (6) | |
| After 1 week | OK |
| After 2 weeks | OK |
| After 3 weeks | OK |
| After 4 weeks | OK |

(1) Stapa Metallic R-607 @65% solids commercially available from Eckart
(2) NOPCO DSX 1550 commercially available from Henkel
(3) Anionically Stabilized latex available from DuPont Company
(4) Balab 3056A commercially available from Witco
(5) ASE-60 Thickener supplied by Rohm and Haas Company and Polyphobe PP-107 :78/22. supplied by Union Carbide
(6) ALU Paint is mixed with iron oxide dispersion and kept in closed container at 49° C.

Example 7

| Paint Formula: | Parts: |
|---|---|
| Mineral spirits | 4.9 |
| (boiling range 140–160° C.) | |
| Ethylene glycol-mono-n-hexylether | 4.9 |
| Ethylene glycol-mono-n-butylether | 10.9 |
| Aluminum Flake | 17.8 |
| (Silverline ® SSP-353) (course aluminum flake 70% solids) | |
| Inhibitor of Example 2 | 4.3 |
| Acrylic latex 30% in water | 61.5 |
| (Adjust till pH is 9) with aminomethylpropanol | 0.90 |
| The gassing was followed by measuring the ml of hydrogen ($H_2$) generated in 16 hours at 60° C. | 5.3 ml |

What is claimed is:

1. An aqueous coating composition comprising a stabilized film-forming polymer, metallic pigments and a corrosion inhibitor which is a hydrophobic-substituted reaction product of (a) and (b), wherein:

(a) is 5 to 95 weight percent of a phosphonic acid derivative consisting of one or

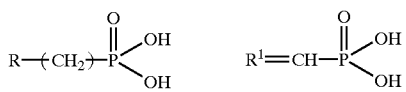

wherein R and $R^1$ are free from nitrogen atom and are selected from the group consisting of an aliphatic, cycloaliphatic and aromatic substituent having 1 to 25 carbon atoms and optionally, Up to 10 heteroatoms of at least one of oxygen, phosphorus and silicon; and (b) is 5 to 95 weight percent of a hydroxy-functional addition polymer comprising a styrene-allyl alcohol polymer having a weight average molecular weight of oxygen 1,000 to 30,000;

wherein said metallic pigments in said aqueous coating composition are stabilized from gassing for three weeks.

2. A composition of claim 1 where the reaction product is in the form of a salt.

3. A composition of claim 1 where the phosphonic acid derivative is selected from the group consisting of propyl phosphonic acid, octyl phosphonic acid, and vinyl phosphonic acid.

4. A composition of claim 1 where the corrosion inhibitor has an acid value of 25 to 400 KOH/g.

5. A composition of claim 1 where the film forming polymers are selected from the group consisting of anionically stabilized vinyl emulsions, anionically stabilized acrylic emulsions and anionically stabilized urethane emulsions.

6. The aqueous coating composition of claim 1 wherein said corrosion inhibitor is a hydrophobic-substituted reaction product of said (a), said (b) and 0 to 90 weight percent of a compound having one hydroxy-functional group.

7. The aqueous coating composition of claim 6 wherein said compound is p-tert amylphenol.

8. An aqueous coating composition comprising a stabilized film-forming polymer, metallic pigments and a corrosion inhibitor which is a hydrophobic-substituted reaction product of (a) and (b), wherein:

(a) is 5 to 95 weight percent of hydroxyethane diphosphonic acid and (b) is 5 to 95 weight percent of hydroxy-functional addition polymer comprising a styrene-allyl alcohol polymer having a weight average molecular weight of 1,000 to 30,000;

wherein said metallic pigments in said aqueous coating composition are stabilized from gassing for three weeks.

9. The aqueous coating composition of claim 8 wherein said corrosion inhibitor is a hydrophobic-substituted reaction product of said (a), said (b) and 0 to 90 weight percent of a compound having one hydroxy-functional group.

10. The aqueous coating composition of claim 9 wherein said compound is p-tert amylphenol.

* * * * *